United States Patent
Armstrong et al.

(10) Patent No.: US 12,370,448 B2
(45) Date of Patent: Jul. 29, 2025

(54) 3D SPATIALISATION OF VOICE CHAT

(71) Applicant: Sony Interactive Entertainment Europe Limited, London (GB)

(72) Inventors: Calum Armstrong, London (GB); Christopher Buchanan, London (GB); Danjeli Schembri, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 165 days.

(21) Appl. No.: 18/151,531

(22) Filed: Jan. 9, 2023

(65) Prior Publication Data
US 2023/0218998 A1    Jul. 13, 2023

(30) Foreign Application Priority Data
Jan. 7, 2022 (GB) ...................................... 2200188

(51) Int. Cl.
*A63F 13/54* (2014.01)

(52) U.S. Cl.
CPC ...... *A63F 13/54* (2014.09); *A63F 2300/1081* (2013.01)

(58) Field of Classification Search
CPC .......................... A63F 13/54; A63F 2300/1081
USPC .......................................................... 463/35
See application file for complete search history.

(56) References Cited

U.S. PATENT DOCUMENTS

| | | | |
|---|---|---|---|
| 7,113,610 B1 * | 9/2006 | Chrysanthakopoulos | H04R 5/02 381/310 |
| 10,206,055 B1 | 2/2019 | Mindlin et al. | |
| 10,496,358 B1 * | 12/2019 | Hirst | H04N 21/8106 |
| 2017/0188168 A1 | 6/2017 | Lyren et al. | |
| 2017/0359467 A1 | 12/2017 | Norris et al. | |
| 2019/0385613 A1 | 12/2019 | Mindlin et al. | |
| 2019/0387351 A1 | 12/2019 | Lyren et al. | |
| 2020/0014792 A1 | 1/2020 | Lyren et al. | |
| 2020/0082632 A1 * | 3/2020 | Burns | G06T 19/20 |
| 2020/0142665 A1 | 5/2020 | Dantrey et al. | |
| 2020/0228911 A1 | 7/2020 | Baszucki | |
| 2021/0322880 A1 * | 10/2021 | Baszucki | A63F 13/54 |

FOREIGN PATENT DOCUMENTS

| | | | |
|---|---|---|---|
| EP | 3313101 B1 * | 7/2020 | H04S 3/008 |
| EP | 4102859 A1 | 12/2022 | |
| JP | 2003006132 A | 1/2003 | |

OTHER PUBLICATIONS

Combined Search and Examination Report for Application No. GB2200188.7 dated Jun. 30, 2022. 8 pgs.

* cited by examiner

*Primary Examiner* — Allen Chan
(74) *Attorney, Agent, or Firm* — Fish & Richardson P.C.

(57) ABSTRACT

The invention provides techniques for intelligently positioning speech in a virtual environment. Factors such as user preferences, the location of virtual environment audio and/or visual events, avatar location, and others can be taken into account when selecting a suitable location for the speech. The virtual environment can be a game environment, a meeting environment, an augmented reality environment, a virtual reality environment, and the like. The invention can be implemented by an audio processing unit which may be part of a game console.

14 Claims, 4 Drawing Sheets

3D SPATIALISATION OF VOICE CHAT

CROSS-REFERENCE TO RELATED APPLICATIONS

The present application claims priority from United Kingdom Patent Application No. 2200188.7, filed Jan. 7, 2022, the disclosure of which is incorporated herein by reference.

BACKGROUND

Sound is a key part of human sensory experience. In the real world, people are accustomed to a 3-dimensional ('3D') auditory experience in which it is possible to determine an approximate origin of a sound in 3D.

Replicating this 3D auditory experience in a virtual environment such as an in-game environment, a virtual reality environment or an augmented reality environment, is challenging. A further layer to this challenge is added in the case of speech. Speech, or 'voice chat', can become difficult for a user to hear in cases where the location of the speech in the virtual environment overlaps with another sound originating in the same or similar location in the virtual environment, or the location of the speech is non-intuitive in some way. This can place a high cognitive burden on a user attempting to separate the speech from other sounds, leading to a corresponding decrease in user experience.

However, it is also desirable to assign speech a 3D location in the virtual environment that is logical from the perspective of the user. Arbitrary placement of speech in a 3D virtual environment, or assignment of no location at all for speech, is therefore also undesirable as it can lead to a lessening of the immersive experience that 3D audio provides and a corresponding decrease in user experience.

In view of at least these problems, it is clear that there is a need for techniques that enable speech to be located in a 3D virtual environment in a manner that preserves the high-quality immersive user experience that 3D audio provides.

SUMMARY OF THE INVENTION

Broadly speaking the invention provides techniques for intelligently positioning speech in a game environment. Factors such as user preferences, the location of game environment audio and/or visual events, avatar location, and others can be taken into account when selecting a suitable location for the speech. The game environment can be an augmented reality environment, a virtual reality environment, and the like. The invention can be implemented by an audio processing unit which may be part of a game console.

In a first aspect the invention provides an audio processing unit configured to: receive an input signal comprising speech produced by a first user; assign a 3-dimensional, 3D, location to the speech, wherein the 3D location is within a game environment in which a second user listening to the speech has a user virtual location that is also within the game environment, and wherein the 3D location is defined relative to the user virtual location; adjust the 3D location based on detection of an event in the game environment; generate an output signal by processing the input signal to modify the speech so as to simulate an origin of the speech at the adjusted 3D location; and transmit the output signal to an audio generation unit for playback to the second user.

In a second aspect the invention provides a system comprising the audio processing unit of the first aspect and an audio generation unit.

In a third aspect the invention provides a method performed by an audio processing unit, the method comprising: receiving an input signal comprising speech produced by a first user; assigning a 3-dimensional, 3D, location to the speech, wherein the 3D location is within a game environment in which a second user listening to the speech has a user virtual location that is also within the game environment, and wherein the 3D location is defined relative to the user virtual location; adjusting the 3D location based on detection of an event in the game environment; generating an output signal by processing the input signal to modify the speech so as to simulate an origin of the speech at the adjusted 3D location; and transmitting the output signal to an audio generation unit for playback to the second user.

BRIEF DESCRIPTION OF THE DRAWINGS

Embodiments of the present invention are described below, by way of example only, with reference to the accompanying drawings, in which.

DETAILED DESCRIPTION

Figure 1:
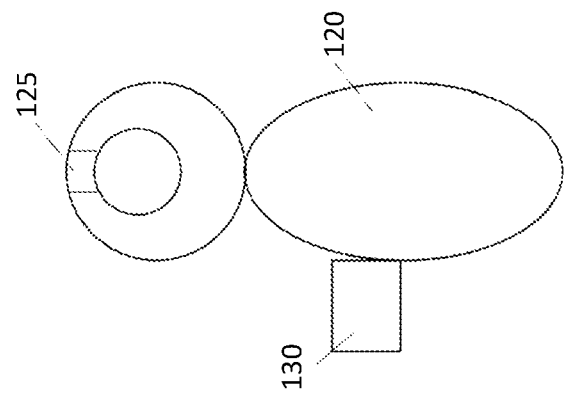
FIG. 1 illustrates in schematic form an exemplary system in which the invention may operate.
Figure 1:
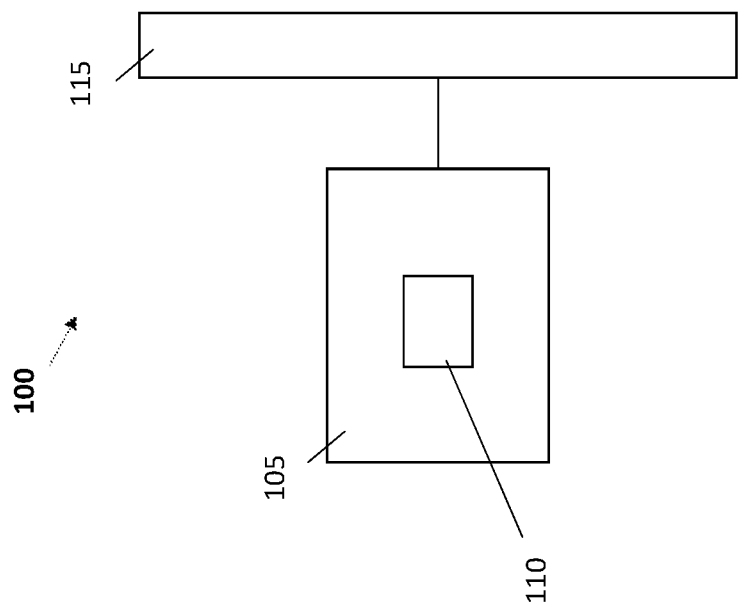

As used herein, the terms below should be understood as follows:

Virtual environment—any environment having a virtual aspect to it. This includes fully virtual environments (virtual reality) and hybrid virtual environments that superimpose a virtual component over a real-world component (augmented reality). Example virtual environments include: a gaming environment, a virtual meeting space, and the like. A virtual environment may be part of a metaverse, where it is understood that a metaverse comprises multiple distinct virtual environments. In the case of a gaming virtual environment, the metaverse may correspond to a particular ecosystem (e.g. the Playstation® ecosystem) and the virtual environments within the metaverse may correspond to individual games, levels within games, particular matches or other forms of cooperative play, etc.

Real world—physical reality that includes no virtual component. A virtual environment is accessed using suitable electronic device(s) such as a game console from a location in the real world. Examples of real-world locations relevant to the invention include a gaming space having one or more game consoles, a videogame arcade, a user's home, a place of work, and the like.

Audio processing unit—a hardware device capable of performing audio processing. This includes general purpose processors such as a central processing unit (CPU) and also audio-specific processors such as the Tempest Engine processor known per se in the art.

Avatar—a representation of a user (a.k.a. 'player') in a virtual environment. The user will typically be able to direct their avatar to carry out actions such as moving around the virtual environment, interacting with virtual objects and other avatars, and the like. An avatar may have virtual eyes and ears that can be respectively used to define a visual field and auditory perception region of the avatar—that is, what the user associated with the avatar can see and hear in the virtual environment.

Non-player character (NPC)— a representation of a human, animal or other 'living' entity within the virtual environment. NPCs are not controlled by any particular user and instead display behaviours governed by software algorithms. NPCs may interact with users, e.g. as a virtual assistant or an adversary in a game, or they may be present to increase the authenticity of the virtual environment, e.g. to simulate a crowd in a virtual city.

Virtual location—a location within a coordinate system of a virtual environment. The coordinate system may be centered on a particular user location, e.g. a location of a user avatar. Here, 'centered' refers to the origin of the coordinate system. It will be appreciated that a virtual environment can have many different coordinate systems each having their respective origin centered on the location of a given user. Alternatively, a global coordinate system can be defined for the virtual location and the location of user avatars within this global coordinate system can be determined.

3-dimensional ('3D')— this refers to a position defined by three spatial dimensions, e.g. x, y and z directions in the case where a cartesian coordinate system is used. The invention is not restricted to use of any particular coordinate system. In the context of the invention 3D locations are often defined within a virtual environment.

Audio event—an event in a virtual environment that generates sound. Examples include: weather effects such as rain impacting a surface, thunder, etc., state changes of virtual objects such as a door opening, a vehicle moving, etc., and sounds associated with avatars and/or NPCs such as footsteps, breathing, etc.

Audio events should be distinguished from speech (a.k.a. 'voice chat'). The term 'speech' as used herein is understood to mean audio that is produced by a user, i.e. a user utterance, as opposed to computer-generated audio that is associated with an audio event. Particularly important to note is that audio events can includes words such as might be associated with a NPC, cutscene, digital assistant, etc.— this is not speech within the meaning as used herein as there is no user utterance corresponding to audio events of this nature. Thus, it is the origin of the sound in the sense of the entity that generated it, not the content, that characterises it as either speech or an audio event.

Visual event—an event in a virtual environment that has an associated visual component. Event implies some form of activity that draws the attention of the user, i.e. a visual event is distinguished from visual components that represent a background element such as floors, walls, etc. Example visual events include: playback of a cutscene, actions taken by NPCs such as movement, addition or removal of an avatar, state changes of virtual objects such as a door opening, a vehicle moving, and informational events like changes on a head-up display ('HUD') that signify an occurrence of something of interest to a user such as a friend, social media contact, colleague, party member, etc. joining a particular virtual environment.

Referring to FIG. 1, an exemplary system 100 in which the invention may operate is shown. The setup of FIG. 1 is shown purely to illustrate the invention in context and is not in any way limiting on the scope of the invention.

System 100 includes a computing device 105 that comprises an audio processing unit 110. In the illustrated example computing device 105 is a game console. The game console can be of any type known or developed in future, and in particular may be from the Sony Playstation® series of consoles. The audio processing unit 110 can be any type of processor capable of performing the invention, and may be a Tempest Engine audio processing unit of the type known per se in the art.

Computing device 105 is communicatively coupled to a display device 115, in this case a television. The coupling can be wired or wireless and may involve an intermediate network, e.g. the internet or a local area network. Computing device 105 is configured to execute software code to enable a user 120 to experience a virtual environment, in this particular example a game environment.

Virtual environments include at least an audio component and very often also have a visual component. In FIG. 1 a display device 115 such as a television displays the visual component of the virtual environment based on signals received from computing device 105. The audio component of the virtual environment is provided by an audio generation unit 125 which in FIG. 1 takes the form of headphones worn by user 120. Collectively the audio and visual components are understood to generate a virtual environment that user 120 experiences. The virtual environment can be an game environment, a virtual space used for virtual meetings, gatherings, etc., an augmented reality environment in which virtual components are displayed in combination with real-world objects and/or people, and the like.

Audio generation unit 125 is communicatively coupled to computing device 105. In FIG. 1 the coupling is not illustrated as it is a wireless coupling, but a wired coupling could equally well be used. The coupling may involve an intermediate network, e.g. the internet, a local area network, etc.

Many different arrangements are possible and the invention is not limited to the specific arrangement of hardware shown in FIG. 1. For example, in alternative embodiments, the components of FIG. 1 could be replaced by any combination of the following:

Computing device 105 could alternatively be a virtual assistant module, a cloud-based computing resource, a laptop, a desktop computer, a tablet computer, a mobile phone, an in-vehicle computation unit, and the like.

Display device 115 could alternatively be a virtual reality headset worn by user 120, a display of a laptop, a display of a tablet computer, a display of a desktop computer, a display of a mobile phone, a holographic projector, an in-vehicle display such as a satellite navigation system display, a cinema screen, etc.

Audio generation unit 125 could alternatively be a speaker which may be embedded in another device, e.g. a television speaker, laptop speaker, tablet speaker, virtual assistant module speaker, in-vehicle speaker, etc. More than one speaker may be present, e.g. in a surround sound-type setup. The speaker or speakers can be portable, e.g. a Bluetooth® sound bar.

Audio generation unit 125 may include a microphone to enable sounds such as user speech to be detected and provided to computing device 105 for integration into the virtual environment. A separate microphone (not shown) can alternatively be used to detect user speech.

While one user has been shown in FIG. 1, it will be appreciated that multiple users may experience the virtual environment while physically located proximate to one another, e.g. in the same room. This setup is often referred to as 'local co-op play', 'local multiplayer', or similar terms in the case of a game.

In some cases the virtual environment does not have a visual component and in this case display device 115 can be omitted entirely. Examples include an audio-only augmented reality environment, e.g. as may be generated by a virtual assistant.

User 120 interacts with the virtual environment using a control device 130. In the illustrated embodiment control device 130 is a game console controller, e.g. a controller from the DualShock® or DualSense® series of Playstation® controllers. The invention is not limited in this regard and control device 130 can take many alternative forms, including a voice command interface, a touchscreen, a computer mouse and/or keyboard, a gesture recognition interface, and the like.

Any one or more of the components of system 100 can be connected to remote computing resources via a data connection (not shown), e.g. a wireless or wired connection to the internet.

Audio processing unit 110 can interact with computing device 105 to obtain information about the virtual environment. For example, audio processing unit 110 may request information about the contents of a virtual environment such as the types, names and/or locations of virtual objects, NPCs and/or avatars. Here, a 'type' is understood to refer to a category or class of item, e.g. object, NPC, avatar, etc. In the case of augmented reality, audio processing unit 110 may request the same information in relation to the virtual environment or the real-world environment. Computing device 105 may provide information about the contents of a selected portion of a virtual environment, e.g. the contents of a virtual environment that is currently within a field of view of a user avatar.

Figure 2:
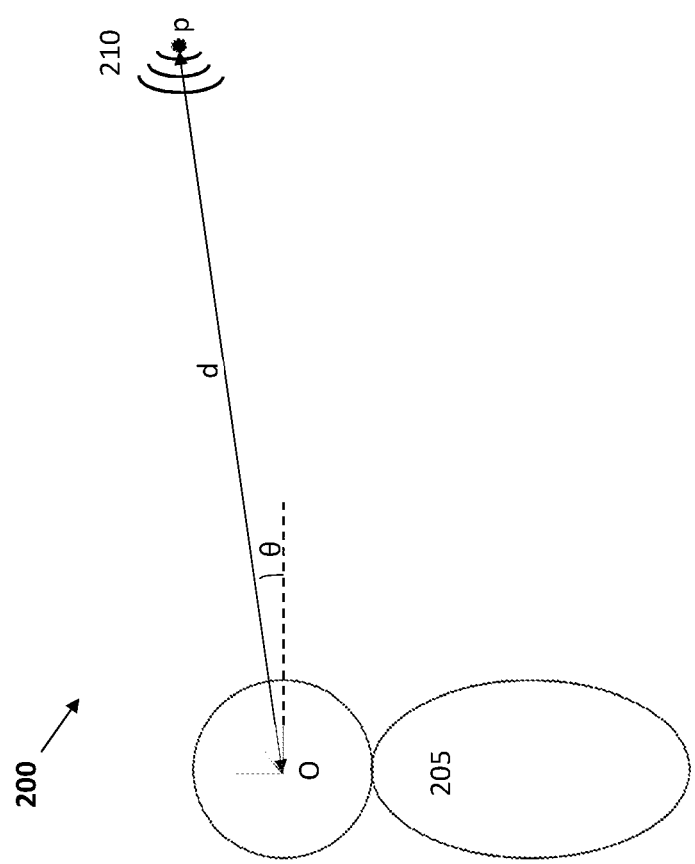
FIG. 2 illustrates in schematic form a virtual environment in which speech is assigned a location according to one or more techniques described in this specification.

Referring now to FIG. 2, a virtual environment 200 is shown. Virtual environment 200 can be, for example, an in-game environment, a virtual space used for meetings, or an augmented reality environment.

Present in virtual environment 200 is an avatar 205 corresponding to user 120. Another user is currently speaking within the virtual environment and in doing so produces speech 210. Audio processing unit 110 is configured to assign a 3D location p to speech 210 within the virtual environment and to generate an output signal that is transmitted to audio generation unit 125 to cause audio generation unit 125 to produce speech that sounds to user 120 as though the speech originates from location p. More details on this process are provided later in connection with FIG. 4.

As shown, avatar 205 is a distance d from the 3D location p assigned to speech 210. This location p is at an angle θ relative to an origin O of the coordinate system that is centered on avatar 205, e.g. at a location corresponding to a virtual ear or ears of avatar 205. The coordinate system shown is purely exemplary and any other coordinate system can alternatively be used to define the location assigned to speech 210 in the virtual environment.

Location p is shown as a point in FIG. 2 for ease of illustration. However, location p is not limited to this. Location p can alternatively be defined as 'non-point source', e.g. a region such as a frontal region relative to the location and orientation of avatar 205. In such a case speech 210 can sound to user 120 as though it is distributed across the region. The speech can be evenly distribution across region, or unevenly distributed, e.g. to take account of the presence of an object, avatar, NPC., etc. in the virtual environment that intersects the region. The region can be continuous like a hemisphere or other such spherical sector, or it can be discontinuous.

The invention encompasses various techniques for assigning the 3D location p to a given instance of speech. Examples according to particular embodiments of the invention are discussed immediately below.

The location p can be a frontal region, e.g. a hemisphere. This can be centered on the location of avatar 205, e.g. the center of the region can be collocated with the origin O of the coordinate system that is centered on avatar 205. The 'front' direction can be defined according to the orientation of avatar 205, e.g. based on a visual field of avatar 205. Speech 210 can be evenly distributed across this region such that it sounds to user 120 as though the speaker is located ahead of them. This may be particularly suitable to situations where the speaker has no particular location within the virtual environment, or is located outside of the visual field of avatar 205—e.g. an 'off screen' player, or an incoming phone call in an augmented reality environment. In such circumstances user 120 does not have any particular expectation as to the location of speech 210 and hence an even frontal distribution provides a good user experience because it does not contradict user expectations whilst also replicating a real-world conversation which is typically carried out facing the person speaking. The cognitive burden on user 120 is thus relatively low.

Alternatively the location p can be selected manually by user 120, e.g. using control device 130. User 120 may be presented with a series of preselected locations to select from, e.g. 'front', 'rear', 'left side', 'right side', etc. User 120 may alternatively be presented with a test virtual environment and invited to select the location p within the virtual environment, e.g. using gestures. The selection process can be somewhat similar to the customisation of loudspeaker locations in a surround sound system. The user may be able to select a region as the origin of the speech and optionally also select the distribution of speech across this region. User 120 may be able to configure and/or adjust the location p manually whilst within a virtual environment, e.g. using a HUD or menu. User 120 may be able to specify conditions under which their manual selection can be automatically overridden, e.g. conditions b), c), e) and/or f) discussed below.

If a test virtual environment is used, the user may be able to play back an audio file containing speech to exemplify how speech will sound if located at the location p as currently selected by the user. The option to save the currently selected location as a user preset can be provided, such that user 120 can build up a 'library' of preferred speech locations that can be switched between while within the virtual environment. User presets may be linked to particular virtual environments, e.g. a user may prefer a first location p1 when gaming and a second, different location p2 when attending a virtual meeting. In such cases audio processing unit 110 can be configured to detect which virtual environment is currently active and load the corresponding user preset for use. Manual selection of location p may be particularly suitable for hearing impaired users having unique and specific hearing requirements, or for users with audio processing difficulties.

Figure 3:
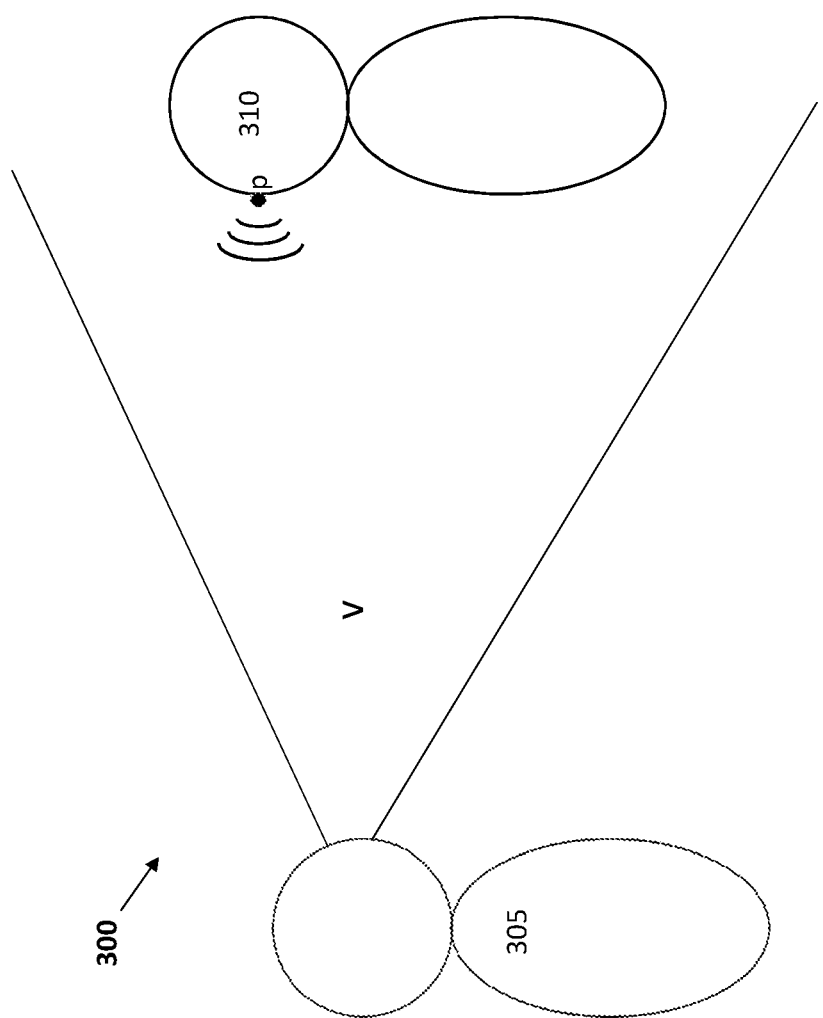
FIG. 3 illustrates in schematic form a virtual environment in which speech is assigned a location based on a location of an avatar of the speaking user.

The location p can be automatically selected by computing device 105 and/or audio processing unit 110 based on the virtual environment. The automated selection of location can take into account any one or more of the following:

a) The location p can be automatically selected based on the location of one or more objects within the virtual environment. For example, in the case where avatar 205 is within a virtual room, the location p can be selected based on a location of a door, window or other such opening within the virtual room. As another example, in an augmented reality setting an avatar representing a phone conversation may be displayed and the location p can be selected to correspond to the location of the avatar. This aligns with subconscious user expectations regarding the origin of speech in such an environment, as built up from experience in the real world, advantageously improving user experience.

b) The location p can be automatically selected to avoid 'collisions' with other sources of sound. For example, in the case where an NPC located to the left of avatar 205 is currently delivering an in-game monologue, the location p can be set to the right of avatar 205 to avoid confusing the speech with the NPC's monologue, increase the intelligibility of the speech. Equally, in an augmented reality setting, a phone call could be assigned a location that does not intersect with the location of a real-world object emitting sound such as a television, radio, etc.

c) The location p can be automatically selected to correspond to an avatar of another user. This is preferred in the scenario where the speech originates from a user having an associated avatar, where the user hearing the speech is aware of the location of the avatar of the user speaking. This scenario is shown in FIG. 3 where speech produced by a first user having an avatar 310 is located at a position p that is collocated with avatar 310, and particularly collocated with the approximate position of a mouth of avatar 310, from the perspective of a second user having a second avatar 305. The avatar 310 of the second user is within the visual field v of the avatar 305 of the first user, such that the first user is aware of the location of avatar 310. It will be appreciated that this creates a positive user experience as it is intuitive and natural for speech to appear to come from a representation of the speaker.

d) In some cases the user that is producing the speech may not have an avatar, or the avatar 310 may be located 'far' from avatar 305, e.g. in a different virtual world within a metaverse, or different region of a virtual world, or not within the visual field of avatar 305. In these circumstances the location p can be set based on the surroundings of the avatar of the user hearing the speech. For example, the location p could be set to the location of a nearby NPC so that it appears to the listening user that the speech is being produced by the NPC. A relevant virtual object may be selected as the apparent source of the speech—for example, the location p could be set to be collocated with a virtual phone. Here, 'relevant' implies the ability for the object to generate sound. If there is no relevant virtual object in the immediate surroundings of the user's avatar, a default location may be used, e.g. a location specified manually by the user or a 'neutral' location like a region in front of the avatar, e.g. a hemisphere. In an augmented reality setting the location p could be set to be collocated with a real-world location of a relevant real world object, e.g. a television, phone, radio, etc. Upon detection of speech, computing device 105 may create a virtual object to use at the source of the speech—e.g. a virtual phone may be created in the field of view of the listening user's avatar, with the location p being set to that of the virtual phone.

e) The location p can be selected to correspond to a real-world position of the user that is speaking. The real-world position of the user can be determined, for example, based on the position of an electronic device like control unit 130 that is in the possession of the speaking user. The electronic device can emit a location signal that enables computing device 105 to determine the real-world position of the electronic device. An example of this is performing an acoustic time-of-flight based calculation using ultrasound emitted by the control unit. Alternatively, the position of the electronic device can be determined passively, for example, processing images provided by a camera (not shown in FIG. 1). Other position determination techniques are also possible, e.g. locating the user using facial recognition technology. This is particularly effective in a 'local play' or 'local co-op' gaming environment where multiple users are physically present in the same real-world location. In this instance it can be more intuitive for a user to hear speech emanating from a location corresponding to their real-world expectations rather than based on a virtual environment location. In such cases it is preferred that all processing of speech produced by local users is performed locally, to avoid effects like lag.

f) The location p can be selected based detection of a significant event in the virtual environment. The event can be an audio event or a visual event of the type discussed above. Information on audio events and/or visual events can be provided by computing device 105 to audio processing unit 110, e.g. according to the instructions of the virtual environment currently being experienced by the user. A visual event in a gaming setting can be the temporary replacement of the virtual environment with a cutscene, or an in-game event requiring increased user attention such as encountering a particularly difficult adversary (a 'boss'). In these circumstances the location p may be selected based on a virtual location of the visual event, e.g. to be relatively unobtrusive so as to avoid drawing the user's attention away from the visual event unfolding in the virtual environment. A relatively unobtrusive location may be, for example, a region such as a hemisphere to the rear of the user's avatar. This advantageously improves user experience as it allows for increased engagement with the virtual world event. It also advantageously enables a developer of a virtual environment to exert some control over the focus of a user's attention, by coding the virtual environment to minimise audio distractions at times where the developer wishes to increase user engagement.

g) In the case of detection of an audio event that generates audio for playback to a user that is currently listening to speech, audio processing unit 110 can identify a 3D location of the audio event and prevent the 3D location assigned to the speech that the user is currently listening to from overlapping with the 3D location of the audio event. Here, 'avoiding an overlap' can be understood to mean that the coordinate(s) at which the audio event originates from are not the same as the coordinate(s) at which the speech originates from. A minimum 'safe distance' may be built into the overlap avoidance, meaning that a specified minimum distance must be present between coordinate(s) at which the audio event originates from and coordinate(s) at which the speech originates from. The location of the speech can be dynamically adjusted as audio events occur, e.g. as a user navigates a virtual environment. Avoidance of overlap can advantageously reduce the cognitive burden on a user listening to the speech as the speech is not obscured by sounds generated by an audio event.

It will be appreciated that combinations of the techniques described under a) to g) above can be used simultaneously.

For example, techniques c), d) and e) can be combined in a situation where there are some users at a common real-world location and other users that are at a different real-world location. Technique b) may temporarily supplant technique a), c) d) or e) in the situation where NPC dialogue is temporarily occurring, but may in turn be overridden by technique f) or g) in the case where a significant virtual event occurs. Technique c) may be used whilst an avatar of a speaking user is within a certain distance of the avatar of a listening user, e.g. the visual field of the listening user's avatar, and then technique d) may replace technique c) as and when the speaking user's avatar goes outside this distance. The reverse can also take place, i.e. switching from technique d) to technique c) when the speaking user's avatar comes within a certain distance of the listening user's avatar. Manual user positioning of the speech source as described above may in turn override all of techniques a) to g), or selectively override some of these techniques.

Sound effects can be added to speech in any of the embodiments described above. The sound effects can be added based on the virtual environment. For example, room effects such as reflection, occlusion and/or diffraction can be added based on the nature of the virtual environment that is local to an avatar of the listening user and/or an avatar of the speaking user. Background sounds such as weather sounds, traffic noise, etc. could be superimposed on the speech, where the background sounds correspond to the virtual environment local to the speaking user. 3D audio processing and dynamics could also be added. Examples include HRTF processing (see below), noise reduction, gain adjustment (e.g. reducing the volume if the position of a voice source is far away, increase volume in the opposite scenario), application of a low pass filter if an in-environment occlusion is detected, and the like. These effects may be referred to as 'propagation effects' and can be added in addition to the 3D locationing discussed in detail in this specification.

In the case where more than one user is speaking simultaneously, i.e. there are multiple sources of speech, in addition to, or in the alternative to, the techniques discussed above, each speech source can be positioned based on consideration of the position of the other speech source(s). A collision avoidance algorithm like that described under g) above can be used to ensure that no two speech sources overlap. The position of a given speech source can be based on the relationship between the listening user and the speaking users, e.g. speaking users that are social media contacts, friends, colleagues, teammates, etc. of the listening user may be given a more prominent location (e.g. frontal region such as a frontal hemisphere) than speaking users that have a lesser or no connection with the listening user.

In the case where NPC dialogue is occurring, an audio event associated with words spoken by the NPC can be generated using natural language processing (NLP). For example, the audio processing unit 110 can be configured to use NLP to recognise the speech of a speaking user and determine a textual representation from the recognised speech. The audio processing unit 110 can segment words in the textual representation; analyse the semantics of the words in the context of the dialogue and the given virtual environment; and determine an appropriate spoken response for the NPC to speak back to the user. As such, the audio processing unit can assign the 3D location of audio generated by NLP at the virtual location of the given NPC with which the audio event is associated.

In a further example, the audio processing unit 110 can be configured to use NLP to recognise the speech of a first user and dynamically determine and accordingly display a textual representation of the speech at an appropriate 3D location. For example, at the request of a second user, the audio processing unit 110 can assign, in real time, the text associated with the speech of the first user at the 3D location of the first user. This allows the second user to read the textual representation of the speech of the first user in real time at the 3D location of the first user. In effect, this aspect provides captions, i.e. subtitles, for voice chat wherein the captions are only visible in the virtual environment to the second user. This aspect is not limited to one first user and can involve many such first users with the textual representations of their speech assigned at the respective 3D locations. This aspect has the advantage of reducing the cognitive burden on the second user and provides additional advantages for second users who are hard of hearing.

In a further example, the audio processing unit 110 can be configured to use NLP to take spoken accessibility instructions from a speaking user. For example, the audio processing unit 110 can use NLP to recognise the speech of a speaking user and "listen" for accessibility instruction commands. Such commands, in the context of a gaming environment, can include phrases such as: "increase the volume by 10%"; "move the 3D location of speech of avatar X to my virtual field of vision"; "move my avatar forward by five paces"; "save the 3D location of avatar X to my favourites"; "mute the voice chat of user Y"; "exit game" etc. The skilled person will recognise that the list of possible accessibility instruction commands is not limited to the examples provided herein and that many such additional commands would be readily contemplated by the skilled person. This aspect has the advantage of improving accessibility and user experience by allowing the speaking user to adjust accessibility settings and/or instruct their avatar without touching a controller.

In a further example, the audio processing unit 110 can be configured to use machine learning (ML) to learn the characteristics of a particular user's speech and generate realistic speech on that basis. Such characteristics can include typical speech patterns; typical phrases and responses to certain phrases; typical speech in response to certain audio and/or visual events; the sound and intonation of their voice; their regional accent and/or other linguistic idiosyncrasies; typical greetings and salutations etc. As before, the person skilled in the art will recognise that the list of possible speech characteristics is not limited to the examples provided herein. For example, in a gaming environment, a second user can select an option to voice chat with a first user even if the first user is not "online" or is otherwise disposed and therefore unavailable to play or speak with the first user. The audio processing unit 110 can generate typical voice chat, i.e. speech, produced by the first user and locate the speech at an appropriate 3D location. Such an appropriate 3D location can include a relevant virtual object or an NPC. This allows the second user to voice chat in an artificial but realistic way with the first user wherein the first user is absent.

Figure 4:
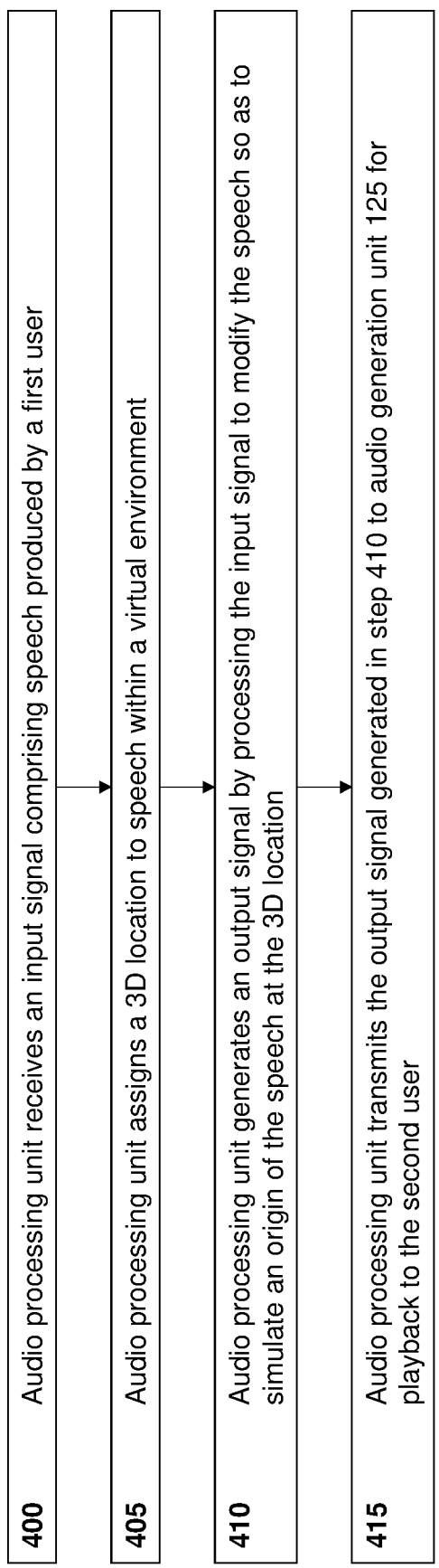
FIG. 4 illustrates a process that can be performed by an audio processing unit to implement embodiments of the invention.

Referring now to FIG. 4, a process that can be performed by audio processing unit 110 to implement embodiments of the invention is shown. Audio processing unit 110 can be configured to carry out the process of FIG. 4, e.g. through the execution of computer code or other such machine-readable instructions that may be stored on a machine-readable storage medium. The machine-readable storage medium may be a non-transitory machine-readable storage medium.

In step 400, audio processing unit 110 receives an input signal comprising speech produced by a first user. The input signal can be received from computing device 105, which may in turn have received the input signal from a remote computer (not shown in FIG. 1), e.g. via a network such as the internet, or from a local device such as a microphone embedded in computing device 105 or another component of system 100. The speech may originate from another user currently within the same virtual environment or metaverse as the listening user.

In step 405 audio processing unit 110 assigns a 3D location to the speech. The 3D location is within a virtual environment in which a second user listening to the speech has a user virtual location that is also within the virtual environment. The 3D location is defined relative to the user virtual location. The 3D location can be assigned based on any of the techniques discussed above, or any combination thereof.

In step 410 the audio processing unit 110 generates an output signal by processing the input signal to modify the speech so as to simulate an origin of the speech at the 3D location. This processing may involve the use of a Head Related Transfer Function, HRTF, as part of the generation of an output audio signal. A HRTF is known per se in the art so a detailed explanation is not provided here. It is sufficient to understand that the HRTF enables audio signals to be generated that take account of the structure of the human head and ear, such that even relatively simple audio generation devices such as headphones can produce highly realistic 3D audio. The invention is not limited to the user of HRTFs to generate 3D audio, however, as any equivalent technique can be used instead.

In step 415 the audio processing unit 110 transmits the output signal generated in step 410 to audio generation unit 125 for playback to the second user. Transmission can be through a wired connection, e.g. between audio generation unit 125 and computing device 105, or a wireless connection such as Bluetooth®, WiFi, etc., also between audio generation unit 125 and computing device 105.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the scope of the claims.

The invention claimed is:

1. An audio processing unit configured to:
   receive an input signal comprising speech produced by a first user;
   assign a 3-dimensional (3D) location to the speech, wherein the 3D location is within a game environment in which a second user listening to the speech has a user virtual location that is also within the game environment, and wherein the 3D location is defined relative to the user virtual location;
   adjust the 3D location based on detection of an event in the game environment and prevent the 3D location from overlapping with a location of the event;
   generate an output signal by processing the input signal to modify the speech so as to simulate an origin of the speech at the adjusted 3D location; and
   transmit the output signal to an audio generation unit for playback to the second user.

2. The audio processing unit of claim 1, wherein the 3D location is a non-point source and an origin of the speech is evenly distributed across the non-point source.

3. The audio processing unit of claim 1, wherein the 3D location is selectable by the second user.

4. The audio processing unit of claim 1, wherein the event is one of: a cutscene in a game or an in-game event associated with increased user attention.

5. The audio processing unit of claim 1, wherein the event is an audio event that generates audio for playback to the second user and the audio processing unit is further configured to:
   detect the audio event in the game environment; and
   identify the location of the audio event.

6. The audio processing unit of claim 1, wherein the event is a visual event having a visual event virtual location and the audio processing unit is further configured to:
   detect the visual event in the game environment; and
   select the 3D location based on visual event virtual location.

7. The audio processing unit of claim 1, being further configured to assign the 3D location to the speech based on a 3D location of at least one of a first avatar associated with the first user or a second avatar associated with the second user, the 3D location of the first avatar or second avatar defined within the game environment.

8. The audio processing unit of claim 7, being further configured to apply one or more acoustic effects to the speech as part of the generating of the output signal, the one or more acoustic effects based on surroundings of the first avatar or the second avatar in the game environment.

9. The audio processing unit of claim 8, wherein the one or more acoustic effects include one or more of: a reflection effect, an occlusion effect, a diffraction effect, a 3D audio processing effect, or a dynamic effect.

10. The audio processing unit of claim 1, being further configured to assign the 3D location to the speech based on a location of the first user in the real world, the location of the first user in the real world defined relative to the location of the second user in the real world.

11. The audio processing unit of claim 10, being further configured to receive a location signal from an electronic device in the possession of the first user, the location signal comprising the location of the electronic device in the real world.

12. The audio processing unit of claim 1, being further configured to assign the 3D location to the speech based on a 3D location of a non-player character, the 3D location of the non-player character defined within the game environment.

13. A system comprising the audio processing unit of claim 1 and an audio generation unit.

14. A method performed by an audio processing unit, the method comprising:
   receiving an input signal comprising speech produced by a first user;
   assigning a 3-dimensional (3D) location to the speech, wherein the 3D location is within a game environment in which a second user listening to the speech has a user virtual location that is also within the game environment, and wherein the 3D location is defined relative to the user virtual location;
   adjusting the 3D location based on detection of an event in the game environment and preventing the 3D location from overlapping with a location of the event;

generating an output signal by processing the input signal to modify the speech so as to simulate an origin of the speech at the adjusted 3D location; and transmitting the output signal to an audio generation unit for playback to the second user.

* * * * *

UNITED STATES PATENT AND TRADEMARK OFFICE
CERTIFICATE OF CORRECTION

PATENT NO. : 12,370,448 B2
APPLICATION NO. : 18/151531
DATED : July 29, 2025
INVENTOR(S) : Calum Armstrong, Christopher Buchanan and Danjeli Schembri Page 1 of 1

It is certified that error appears in the above-identified patent and that said Letters Patent is hereby corrected as shown below:

In the Claims

In Column 12, Line 9, Claim 4, delete "of:" and insert -- of --.

Signed and Sealed this
Thirtieth Day of December, 2025

John A. Squires
*Director of the United States Patent and Trademark Office*